(12) United States Patent
Cox et al.

(10) Patent No.: US 11,641,964 B2
(45) Date of Patent: May 9, 2023

(54) HANGING BRACKET

(71) Applicant: CANHANG ENTERPRISE LTD., Penticton (CA)

(72) Inventors: Greg Cox, Penticton (CA); Lorraine Cox, Penticton (CA)

(73) Assignee: CANHANG ENTERPRISE LTD., Penticton (CA)

( * ) Notice: Subject to any disclaimer, the term of this patent is extended or adjusted under 35 U.S.C. 154(b) by 0 days.

(21) Appl. No.: 17/163,195

(22) Filed: Jan. 29, 2021

(65) Prior Publication Data

US 2022/0151416 A1 May 19, 2022

(51) Int. Cl.
*A47G 29/08* (2006.01)
*F16M 13/02* (2006.01)

(52) U.S. Cl.
CPC ............. *A47G 29/08* (2013.01); *F16M 13/02* (2013.01)

(58) Field of Classification Search
CPC ................ A47G 25/0685; A47G 7/045; A47G 25/0614; A47G 29/08; F16M 13/02
See application file for complete search history.

(56) References Cited

U.S. PATENT DOCUMENTS

| | | | |
|---|---|---|---|
| 1,736,109 A | 4/1929 | Barton | |
| 2,433,247 A * | 12/1947 | Stowell | A47G 25/0685 211/100 |
| 2,743,023 A * | 4/1956 | Larson | A47G 25/0685 248/278.1 |
| 3,696,672 A | 10/1972 | Lindsay | |
| 4,553,430 A | 11/1985 | Behrens | |
| 4,666,115 A | 5/1987 | Schiro | |
| 5,022,624 A * | 6/1991 | Hill | F16M 13/02 248/68.1 |
| 5,320,061 A | 6/1994 | Laughlin et al. | |
| 5,407,170 A * | 4/1995 | Slivon | B25H 3/06 211/70.1 |
| 6,672,243 B2 | 1/2004 | Seymour et al. | |
| 6,708,832 B1 | 3/2004 | Hannon | |
| 7,152,838 B2 | 12/2006 | Taulbee | |
| 7,175,146 B2 * | 2/2007 | Kim | F16M 11/10 211/100 |
| 7,806,280 B1 * | 10/2010 | Perkins | A47G 25/0685 211/100 |
| 7,967,268 B2 | 6/2011 | Herron, III et al. | |
| 8,028,964 B2 * | 10/2011 | Monaco | F16M 11/10 248/921 |
| 8,607,497 B2 | 12/2013 | Green | |
| 9,605,798 B2 * | 3/2017 | Brown | F16M 13/02 |
| 10,001,244 B2 * | 6/2018 | Ziaylek | B60R 11/00 |
| 10,288,219 B1 * | 5/2019 | Walberg | F16M 13/02 |
| 10,634,279 B2 * | 4/2020 | Lu | F16M 13/02 |

(Continued)

FOREIGN PATENT DOCUMENTS

GB 2498001 3/2013

*Primary Examiner* — Bradley Duckworth
(74) *Attorney, Agent, or Firm* — Richard D. Okimaw

(57) ABSTRACT

An apparatus for hanging articles comprises a plate having a top hanger and extending between first and second side edges, a pair of side plates extending from each of the first and second side edges of the plate, the pair of side plates having a plurality of mounting bores therethrough and first and second brackets each extending between top and bottom connectors receivable in two of the plurality of mounting bores.

19 Claims, 5 Drawing Sheets

(56) References Cited

U.S. PATENT DOCUMENTS

| | | |
|---|---|---|
| 10,774,982 B2 * | 9/2020 | Sung .................... H05K 5/0204 |
| 10,835,061 B2 * | 11/2020 | Kressin ................ F16M 13/022 |
| 2010/0212199 A1 | 8/2010 | Edmonds |
| 2013/0193287 A1 | 8/2013 | Murphy |
| 2014/0366623 A1 | 12/2014 | Anderson |
| 2019/0104874 A1 * | 4/2019 | Baines ................ A47G 25/0614 |
| 2022/0016466 A1 * | 1/2022 | Henniger ........... A63B 23/0405 |

* cited by examiner

HANGING BRACKET

BACKGROUND

1. Technical Field

This disclosure relates generally to decorations and in particular to an apparatus and method for hanging decorative articles.

2. Description of Related Art

Decorative articles are frequently desired to be hung or otherwise displayed at a permanent or temporary residence for many people. Such articles may be selected from a wide variety, including, without limitation, wind socks, ornaments and other articles.

One frequent method to hang such decorative articles is with the use of a bracket which may be secured to a tree, building, pole or the like. Such brackets provide a secure location to hang the decorative article. Disadvantageously, such brackets are frequently secured in a permanent manner to such surfaces which makes removal and relocation difficult. In particular one common method for securing such brackets to an object such as a tree or the like is to pass a screw, nail or other fastener through one or more bores in the bracket to secure it to the object. It will be appreciated that such fasteners will therefore inhibit removal of the bracket.

SUMMARY OF THE DISCLOSURE

According to a first embodiment, there is disclosed an apparatus for hanging articles comprising a plate having a top hanger and extending between first and second side edges, a pair of side plates extending from each of the first and second side edges of the plate, the pair of side plates having a plurality of mounting bores therethrough and first and second brackets each extending between top and bottom connectors receivable in two of the plurality of mounting bores.

The top and bottom connectors of the first and second brackets may comprise hooks. The first and second brackets may comprise elongate wires. The elongate wires may be flexible. The elongate wires may be formed of a first portion extending between the top connector and a distal end and a second portion extending between the bottom connector and a distal end. The first and second portions may be continuous with each other. The first and second portions may form a bend radius at the distal end. The distal ends of the first and second brackets may be secured together with a clip.

Each of the side plates may include at least three mounting bores. Each of the mounting bores may have the same size and shape as each other. The mounting bores may be arranged in pairs at an equal height on the opposed side plates. The plate includes top and bottom mounting members may extend therefrom having top and bottom mounting bores therethrough. The bottom mounting bore may have a greater diameter than the top mounting bore. The top mounting bore may be sized to be threaded onto the end of a broom handle. The bottom mounting bore may be sized to receive a broom handle therethrough. The top and bottom mounting members may be formed of panels extending from the plate.

The top hanger may comprise a planar portion extending away from the top edge of the plate to an opposite side from the pair of side plates. The top hanger may include a downwardly extending lip at a distal edge thereof. The apparatus may further comprise a spacer operable to space a bottom edge of the plate away from an object so as to maintain the apparatus in a substantially vertical orientation.

According to a further embodiment, there is disclosed a method for hanging articles comprising securing a top hanger at the top distal end of a plate, wherein the plate extends between first and second side edges, securing first and second brackets each extending between top and bottom connectors in two of a plurality of mounting bores, the mounting bores located in a pair of side plates extending from each of the first and second side edges of the plate and securing an article to the distal ends of the first and second brackets.

Other aspects and features of the present disclosure will become apparent to those ordinarily skilled in the art upon review of the following description of specific embodiments in conjunction with the accompanying figures.

BRIEF DESCRIPTION OF THE DRAWINGS

The accompanying drawings constitute part of the disclosure. Each drawing illustrates exemplary aspects wherein similar characters of reference denote corresponding parts in each view.

DETAILED DESCRIPTION

Figure 1:
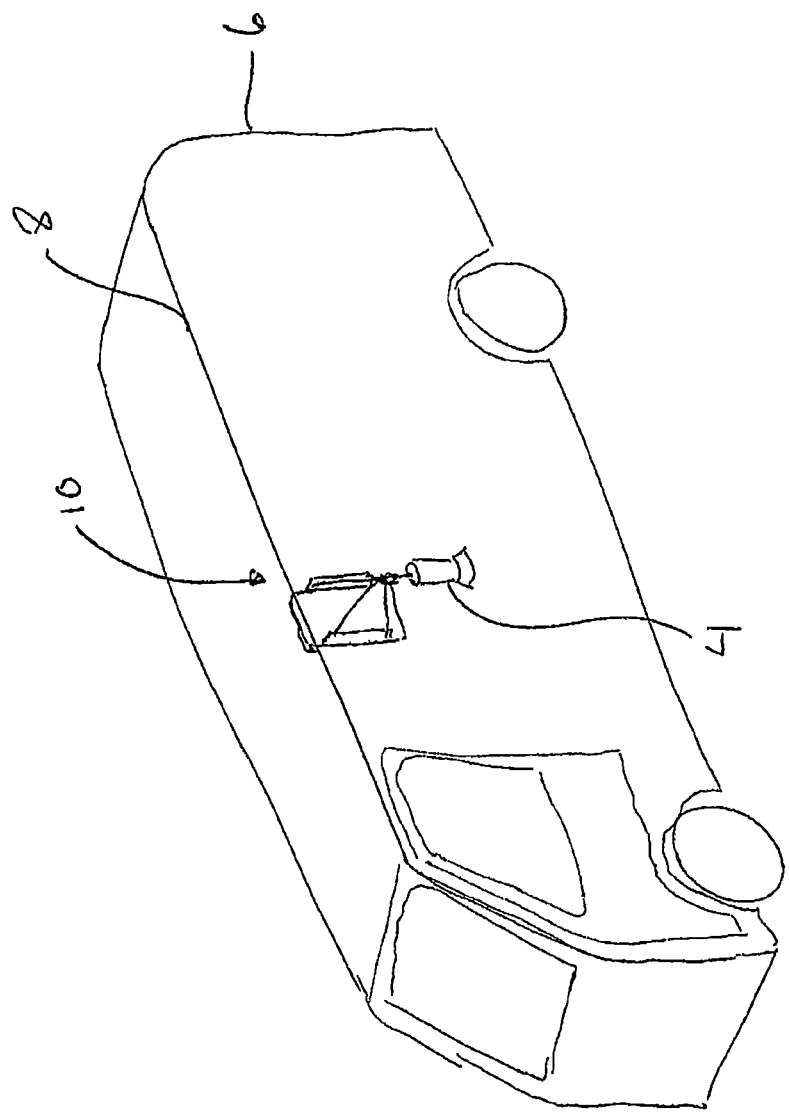
FIG. 1 is a perspective view of an apparatus for hanging articles applied to the edge of a recreational vehicle according to a first embodiment of the present disclosure.

Aspects of the present disclosure are now described with reference to exemplary apparatuses, methods and systems. Referring to FIG. 1, an exemplary apparatus for hanging an article 4 according to a first embodiment is shown generally at 10. As illustrated in FIG. 1, the apparatus 10 may be hung or otherwise suspended from the edge 8 of a recreational vehicle 6. It will be appreciated that the apparatus may be suspended, positioned or hung on a number of other surfaces, such as, by way of non-limiting example, gutters, t-mouldings or a cooperating bracket mounted to a building, such as a facia.

The apparatus 10 comprises a base plate 12, having a pair of side plates 30 supporting a pair of triangular brackets 40 which are connected together at a distal end by a clip 80 to suspend an article from. The article to be suspended from the apparatus 10 may comprise an insect trap, solar light, planter, bird feeder, wind chime or any other decorative or ornamental article.

The base plate 12 extends between top and bottom edges, 14 and 16, respectively and first and second side edges 18 and 20 respectively. The base plate 12 includes a front and rear surface 22 and 24, respectively. The base plate 12 may be formed of any suitable material, such as, by way of non-limiting example, metal, plastics, composite materials or the like. The base plate provides a rigid support platform for supporting the remainder of the portions of the apparatus to hang the article from an object.

Figure 4:
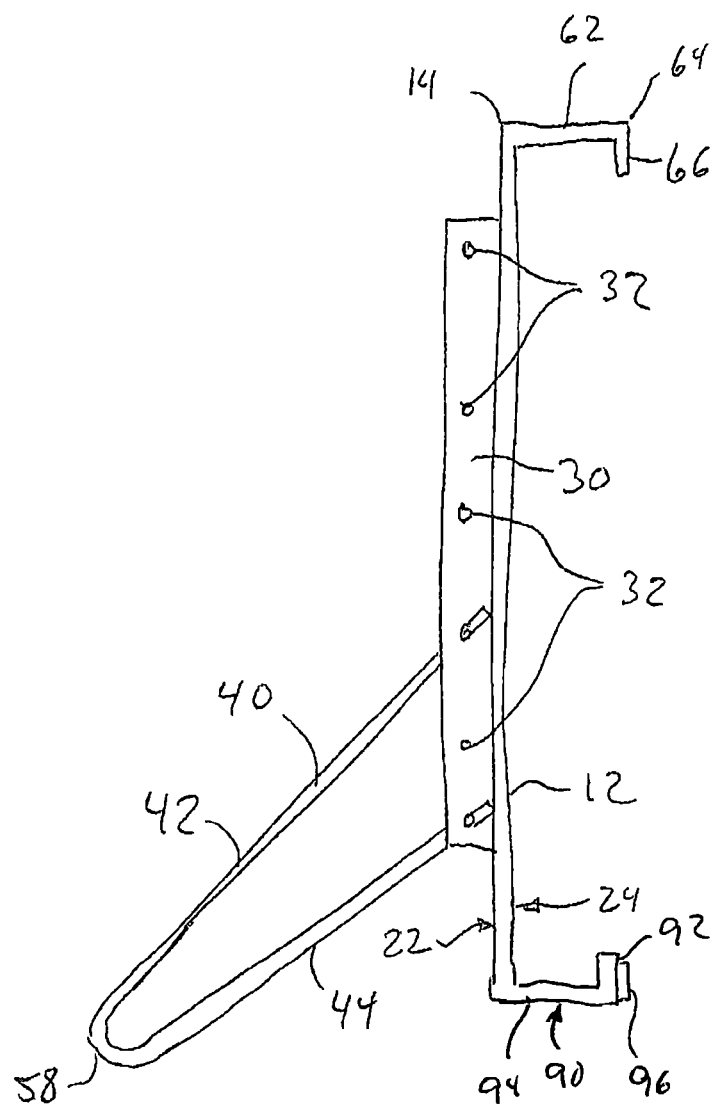
FIG. 4 is a side view of the apparatus of FIG. 1 at a second configuration.

Optionally, as illustrated in FIG. 4, the bottom end or any other location along the base plate 12 may include a spacer member 90 extending from the rear surface 24. The spacer member 90 may extend a distance from the base plate 12 selected to space the bottom end of the base plate 12 away form the recreational vehicle or other object on which the apparatus is hung. The spacer member 90 also assists in maintaining the base plate 12 in a substantially vertical orientation. As illustrated in FIG. 4, the spacer member 90 may include a rear plate 92 extending substantially parallel to the base plate which may extend from a horizontal portion 94 of the spacer member 90 in any desired direction. The rear plate 92 may include a surface treatment 96, such as, by way of non-limiting example, foam or padding to prevent slipping of the spacer member 90 on the surface of the recreational vehicle or any other object.

Figure 2:
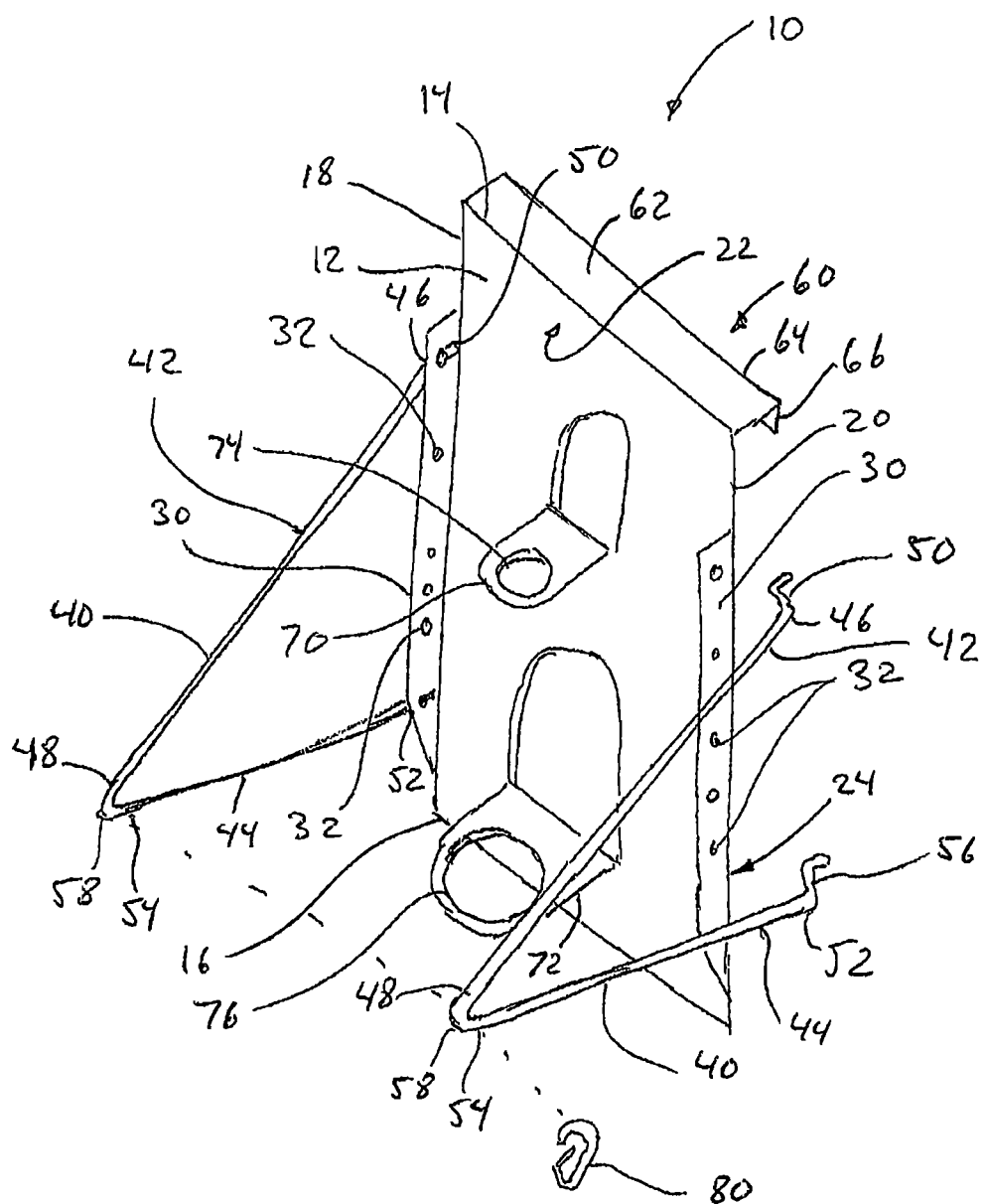
FIG. 2 is an exploded perspective view of the apparatus of FIG. 1.

The side plates 30 extend perpendicularly from the first and second side edges 18 and 20 of the base plate 12. Although continuous side plates 30 are illustrated and described herein, it will be appreciated that other structures may also be utilized, such as, by way of non-limiting example, tabs, bores in the base plate 12 or the like. The side plates 30 extend in a direction to the front surface 22 of the base plate and include a plurality of bracket bores 32 therethrough. Each of the bracket bores 32 are formed to have the same size diameter corresponding to the diameter of the brackets 40 as will be more fully described below. As illustrated in FIG. 2, the plurality of bracket bores 32 are positioned on each of the side plates 30 so as to correspond to each other in matching pairs at a common height. In such a manner, the brackets located in matching pairs of bracket bores 32 will have a similar shape facilitating their connection at their distal end as will be more fully described below. As illustrated herein, the side plates 30 are shown as having 6 bracket bores each, although it will be appreciated that any other quantity may also be utilized.

Figure 3:
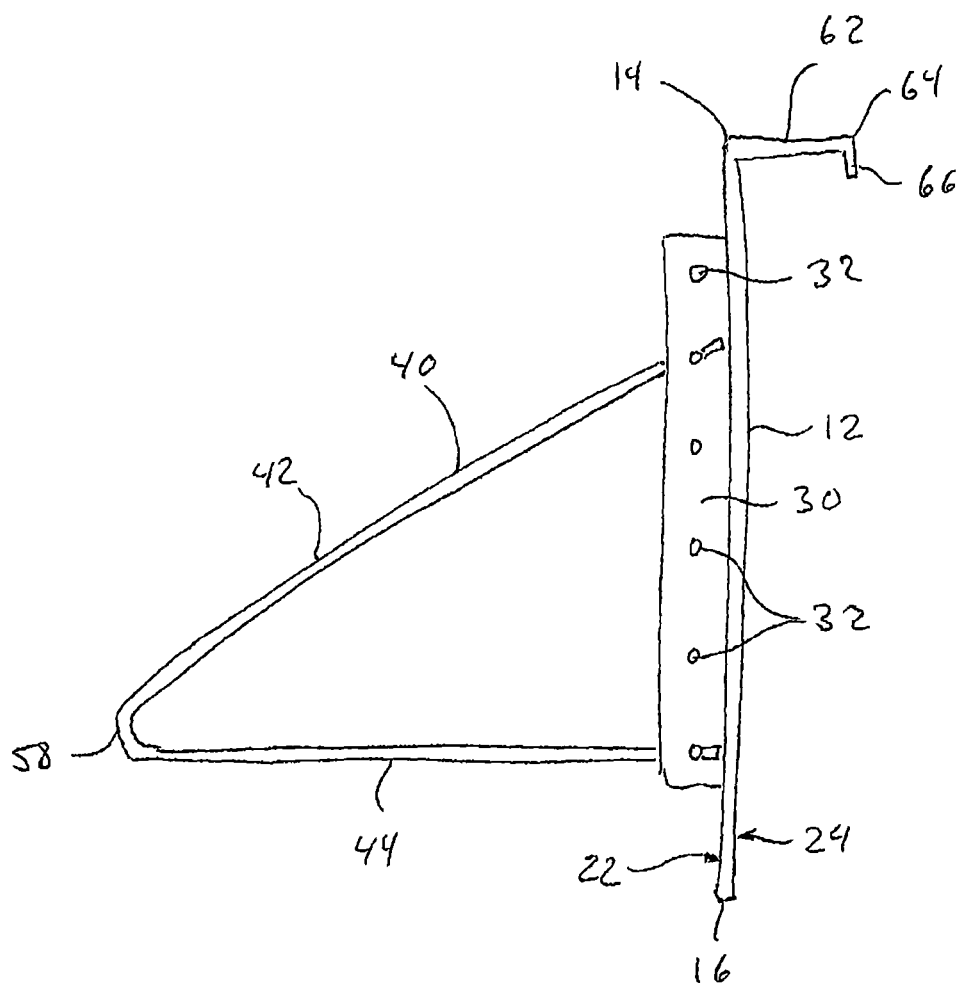
FIG. 3 is a side view of the apparatus of FIG. 1 at a first configuration.

Each of the brackets 40 is formed of a first top portion 42 and a second bottom portion 44. The top portion 42 extends from a proximate end 46 to a distal end 48 wherein the proximate end includes a hook or offset 50 adapted to be passed through one of the bracket bores 32 so as to secure the top portion 42 therein. It will also be appreciated that other connector types at the ends of each of the top and bottom portions 42 and 44 may be utilized, such as, by way of non-limiting example, pins, z-shaped bends or the like. The bottom portion 44 extends from a proximate end 52 to a distal end 54 wherein the proximate end includes a hook or offset 56 adapted to be passed through one of the bracket bores 32 so as to secure the bottom portion 44 therein. The distal ends 48 and 54 of the top and bottom portions are connected to each other so as to form a continuous bracket between the top and bottom portions 42 and 44. In particular, the top and bottom portions 42 and 44 may be formed continuous with each other having a radiused bend 58 at the distal ends thereof. Each bracket 40 may be formed of a flexible wire so as to be operable to be bent about the radiused bend 58 thereby changing the angle between the top and bottom portions 42 and 44. It will also be appreciated that the brackets 40 may be formed of any other profile, such as, by way of non-limiting example, tubes, box channel, I-beam or the like so long as the material is selected to be flexible enough to permit the hooks 50 and 56 in different pairs of bracket bores 32. In such a manner, a user may select any combination of the bracket bores 32 through which to pass the hooks 50 and 56 through so as to adjust the angle between the top and bottom portions 42 and 44. In particular as illustrated in FIG. 3, the top portion 42 may have a length greater than the bottom portion 44 such that when the hooks 50 and 56 are spaced further apart, the bracket 40 will extend substantially outwardly from the base plate 12 with the bottom portion 44 substantially horizontal. Such a configuration will extend the radiused bend 58 further and thereby the article further from the base plate 12. Correspondingly, as illustrated in FIG. 4, when the hooks 50 and 56 are located in bracket bores 32 close together, the top and bottom portions 42 and 44 will have a reduced angle therebetween such that both the top and bottom portions 42 and 44 will be oriented in a downward direction thereby maintaining the radiused bend 58 and the article closer to the base plate 12.

The top edge 14 of the base plate may include a mounting hook, generally indicated at 60. The mounting hook 60 may be of any form adapted to engage upon or suspend the apparatus 10 from an edge. In particular, as illustrated herein, the mounting hook 60 may comprise a top plate 62 extending perpendicularly from the top edge 14 of the base plate 12 in a direction away from the rear surface 24 of the base plate 12. The top plate may extend to a distal end 64 parallel to the top edge 14 of the base plate wherein the distal end 64 includes a downwardly oriented lip 66 extending therefrom. In operation, the lip 66 may catch behind the edge of a body, such as, by way of non-limiting example, a recreational vehicle edge, on which the apparatus is intended to be secured.

Figure 5:
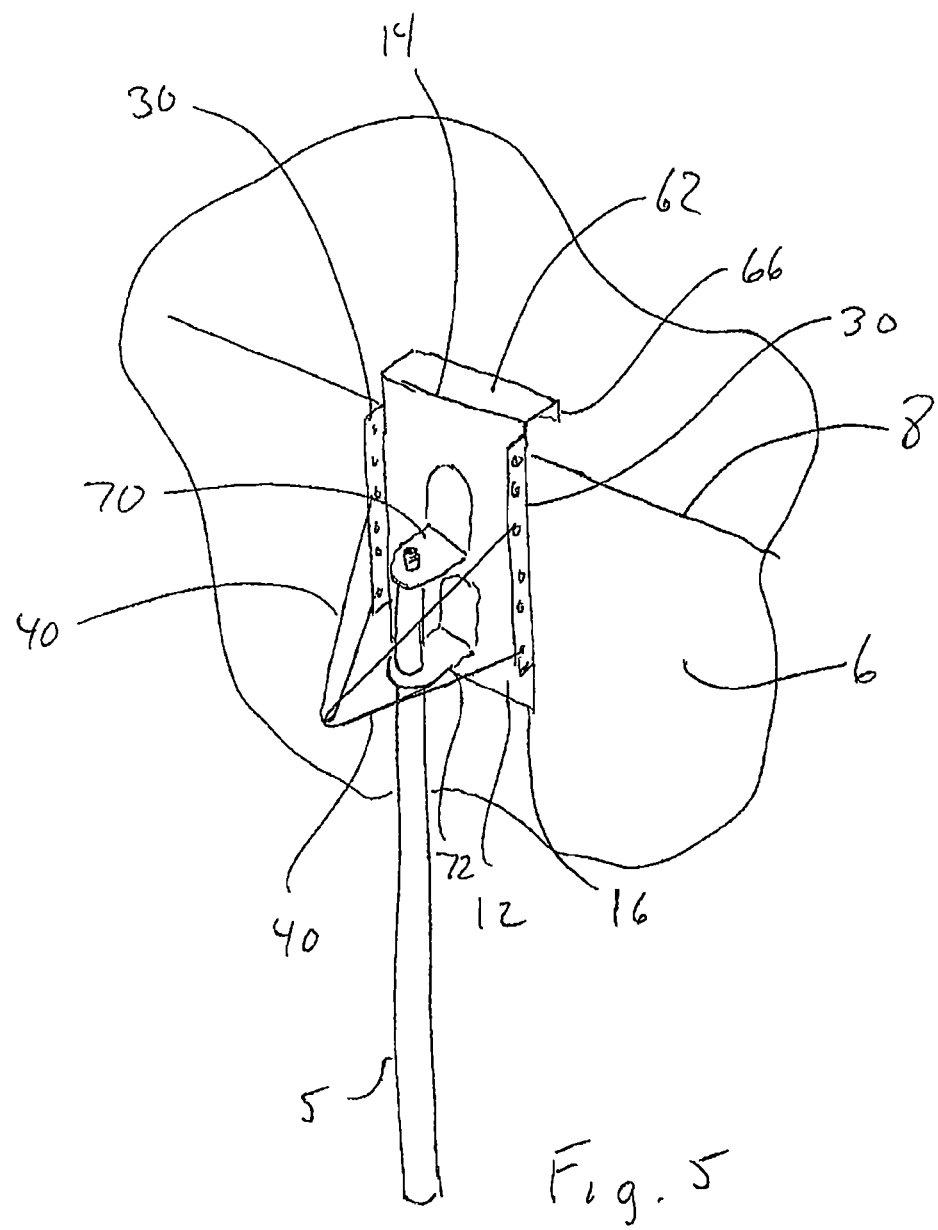
FIG. 5 is a perspective view of the apparatus of FIG. 1 located on a mounting pole.

The base plate 12 may optionally include a pair of mounting plates 70 and 72 extending from the front surface 22 thereof. The mounting plates may comprise a top mounting plate 70 having a top mounting bores 74 extending therethrough and bottom mounting plate 72 having a bottom mounting bore 76 extending therethrough. Each of the mounting plates extends substantially horizontally and perpendicularly from the base plate such that each of the top and bottom mounting bores 74 and 76 extends along a vertical axis. As illustrated in FIG. 2, each of the top and bottom mounting bores 74 and 76 may extend along a common axis 78. The bottom bore 76 may be selected to be larger than the top bore 74 and in particular, the bottom bore may be selected to have a diameter sufficient for a broom handle (as are commonly known) to be passed therethrough. Similarly, the top bore 74 may be selected to have a diameter sufficient for the threading on the end of a broom handle (as is commonly known) to be threadably or otherwise passed therethrough which is commonly smaller than the diameter of such a broom handle. In such a manner, a pole 5 as illustrated in FIG. 5, may be passed through the bottom mounting bore 76 and threadably or otherwise engaged within the top mounting bore 74. The pole 5 may then be utilized to position the apparatus on the object on which the apparatus is to be secured, such as, by way of non-limiting example, the edge of a recreational vehicle. It will be appreciated that other articles may be passed through the bores 74 and 76 to mount the apparatus 10 in the desired location. It will also be appreciated that other connection means between the pole 5 and the top and bottom bores may be utilized as well. Once positioned in the desired location, the broom handle 5 may be threadably or otherwise removed from the bores 74 and 76 so as to leave the apparatus in the desired location. As illustrated in FIG. 2, the top and bottom mounting plates 70 and 72 may be formed by cutting out a portion of the base plate 12 and bending the top and bottom mounting plates outwardly therefrom.

In operation, a user places the hooks 50 and 56 through the selected bracket bores 32 so as to position the brackets 40 at the desired angle and distance from the base plate 12. Once the brackets 40 are located in their desired bracket bores, the radiused bends 58 may then be brought together and a clip 80 secured therearound so as to secure the radiused bends 58 together. The apparatus may then be located on an object, such as, by way of non-limiting example, a recreational vehicle edge or the like as set out above. Thereafter the article may be hung or otherwise suspended from the clip 80. Optionally, it will be appreciated that the article may also be hung form the clip 80 prior to locating the apparatus on the object so as to allow the apparatus and article to be lifted together by the pole thereby allowing a user to not need the use of a ladder or the like.

While specific embodiments have been described and illustrated, such embodiments should be considered illustrative only and not as limiting the disclosure as construed in accordance with the accompanying claims.

What is claimed is:

1. An apparatus for hanging articles comprising:
    a plate having a top hanger and extending between first and second side edges;
    a pair of side plates extending from each of the first and second side edges of the plate, the pair of side plates having a plurality of mounting bores therethrough; and
    first and second brackets each extending between top and bottom connectors receivable in two of the plurality of mounting bores, and;
    top and bottom mounting members extending from the plate having top and bottom mounting bores therethrough.

2. The apparatus of claim wherein the top and bottom connectors of the first and second brackets comprise hooks.

3. The apparatus of claim 1 wherein the first and second brackets comprise elongate wires.

4. The apparatus of claim 3 wherein the elongate wires are flexible.

5. The apparatus of claim 4 wherein the elongate wires are formed of a first portion extending between the top connector and a distal end and a second portion extending between the bottom connector and a distal end.

6. The apparatus of claim 5 wherein the first and second portions are continuous with each other.

7. The apparatus of claim 6 wherein the first and second portions form a bend radius at the distal end.

8. The apparatus of claim 7 wherein the distal ends of the first and second brackets are secured together with a clip.

9. The apparatus of claim 1 wherein each of the side plates includes at least three mounting bores.

10. The apparatus of claim 9 wherein each of the mounting bores have the same size and shape as each other.

11. The apparatus of claim 9 wherein the mounting bores are arranged in pairs at an equal height on the opposed side plates.

12. The apparatus of claim 1 wherein the bottom mounting bore has a greater diameter than the top mounting bore.

13. The apparatus of claim 1 wherein the top mounting bore has a diameter selected to correspond to the narrow diameter of threading on the end of a broom handle.

14. The apparatus of claim 1 wherein the bottom mounting bore is sized to receive a broom handle therethrough.

15. The apparatus of claim 1 wherein the top and bottom mounting members are formed of panels extending from the plate.

16. The apparatus of claim 1 wherein the top hanger comprises a planar portion extending away from the top edge of the plate to an opposite side from the pair of side plates.

17. The apparatus of claim 16 wherein the top hanger includes a downwardly extending lip at a distal edge thereof.

18. The apparatus of claim 1 further comprising a spacer operable to space a bottom edge of the plate away from an object so as to maintain the apparatus in a substantially vertical orientation.

19. A method for hanging articles comprising:
    providing a top hanger at the top distalend of a plate, wherein the plate extends between first and second side edges;
    locating the top hanger on a surface by lifting the plate by passing a lifting article within top and bottom mounting bores within corresponding top and bottom mounting members extending from the plate;
    securing first and second brackets each extending between top and bottom connectors in two of a plurality of mounting bores, the mounting bores located in a pair of side plates extending from each of the first and second side edges of the plate; and
    securing an article to the distal ends of the first and second brackets.

* * * * *